(12) United States Patent
Tsuboi et al.

(10) Patent No.: US 6,917,126 B2
(45) Date of Patent: Jul. 12, 2005

(54) SLIDING MEANS WITH BUILT-IN MOVING-MAGNET LINEAR MOTOR

(75) Inventors: Takaaki Tsuboi, Kanagawa-ken (JP); Shoji Fujisawa, Kanagawa-ken (JP); Masaki Ohno, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 752 days.

(21) Appl. No.: 09/871,730

(22) Filed: Jun. 4, 2001

(65) Prior Publication Data

US 2001/0048249 A1 Dec. 6, 2001

(30) Foreign Application Priority Data

Jun. 2, 2000 (JP) ........................................ 2000-166398

(51) Int. Cl.[7] ........................ H02K 41/02; H02K 41/00; H02K 9/19
(52) U.S. Cl. ............................. 310/12; 310/12; 310/13; 310/14; 310/16; 310/62; 310/52; 318/135
(58) Field of Search .......................................... 310/12

(56) References Cited

U.S. PATENT DOCUMENTS 4,749,921 A * 6/1988 Chitayat ..................... 310/135
5,838,079 A * 11/1998 Morohashi .................... 310/12
6,005,310 A * 12/1999 Mosciatti ...................... 310/12
6,348,746 B1 * 2/2002 Fujisawa ....................... 310/12

FOREIGN PATENT DOCUMENTS

| JP | 298946/1989 | 12/1989 |
| JP | 322232/1996 | 12/1996 |
| JP | 266659/1997 | 10/1997 |

* cited by examiner

*Primary Examiner*—Nestor Ramirez
*Assistant Examiner*—I. A. Mohandesi
(74) *Attorney, Agent, or Firm*—Browdy and Neimark (57) ABSTRACT

A sliding means with built-in moving-magnet linear motor is provided, realizing high-speed operation and much response ability of a table to a stationary bed, and also accurate position control of the table to the bed. With the sliding means of this invention, armature windings carry a three-phase current while a driving circuit is transferred to the external driver to make the bed slim in construction. Thus, the sliding means is reduced in overall height. A field magnet of rare earth permanent magnet is effective in raising flux density, thereby providing high propulsion for the table. An encoder to monitor a position of the table is an optical encoder having an optical linear scale, which contributes to improvement in accurate monitoring. The construction in which the armature windings connected to cords, lines, and so on are placed on the stator side has no fear of causing dust and dirt, thus realizing clean environment.

10 Claims, 7 Drawing Sheets

SLIDING MEANS WITH BUILT-IN MOVING-MAGNET LINEAR MOTOR

BACKGROUND OF THE INVENTION

1. Field of the Invention

The present invention relates to sliding means that have been extensively used in machines and instruments as diverse as semiconductor manufacturing apparatus, machine tools, industrial robots, conveyors and others. It is more particularly concerned with a sliding means with built-in moving-magnet linear motor, in which an exciting winding is arranged in a stationary bed while a magnet is installed in a moving table.

2. Description of the Prior Art

In recent years, multi-axis stages and moving mechanisms employed in the diverse technical fields as described above have required more and more sliding means, which are compact or slim in construction and light in weight, and moreover able to operate with high propulsion, high speed and high response to provide high speed travel and accurate position control for works, tools, articles and instruments. Linear motors commonly used in the sliding means involve two broad types. The first, called moving-coil linear motor, has a stator of field magnet mounted on a stationary bed, and moving-armature coils arranged on a table movable lengthwise of the bed in space one after another such that they lie a preselected phase angle. The second, called moving-magnet linear motor, has a stator of armature windings arranged lengthwise over the entire length of a bed, and a moving-field magnet of permanent magnet arranged on a table movable in a sliding manner along the length of the bed.

Japanese Patent Laid-Open No. 322232/1996 discloses a linear motor installed in a knitting machine to drive a knitting needle in reciprocating motion. The liner motor is comprised of a plurality of built-in moving-coil liner motor units each of which has a moving assembly composed of a backing plate made therein a window, a resilient sheet member fixed on any one side of the backing plate with adhesive, and exciting windings, for example three windings, arranged on any one surface of the sheet member in a manner to be partly accommodated in the window. The exciting winding is made in the form of flat ellipse where the axial direction of the winding extends thickness-wise of the linear motor unit. The moving assembly is arranged for linear movement between stator assemblies confronting one another, each of which is composed of a backing plate made of ferromagnetic material such as steel, and a plurality of permanent magnet, for example six pieces arranged on the backing plate in juxtaposition along the traveling direction of the moving assembly. The construction in which the exciting windings are accommodated in the associated window in the backing plate reduces the overall thickness or height of the moving assembly. Linear displacement-measuring means is composed of a linear scale extending along the moving direction of the moving assembly, and a sensor head installed on any one of the confronting stator assemblies.

A moving-magnet brushless dc linear motor is disclosed in Japanese Patent Laid-Open No. 298946/1989, in which a semiconductor rectifier is arranged for each coil, and two sets of three-phase coil groups are arranged to provide a linear motor of three-phase conduction system.

A sliding means adapted to be used for machine tools and industrial robots is disclosed in Japanese Patent Laid-Open No. 266659/1997, which is a senior application of the present applicant. The prior sliding means includes a driving source made of an electromagnetic linear actuator and a built-in moving-magnet uniaxial linear motor to control with precision a position of a driven article. With the prior sliding means cited just above, an electromagnetic linear actuator is arranged between a moving table and stationary bed of steel or magnetic material and at least any one of the table and the bed is constructed to serve a part of magnetic circuit of the electromagnetic linear actuator, concretely the function of either magnet yoke or coil yoke. The prior sliding means has no need of providing separately yokes for establishing magnetic circuit, which might make the sliding means bulky, thus reduced in the number of parts required, and made inexpensive in production cost and slim in construction.

Figure 14:
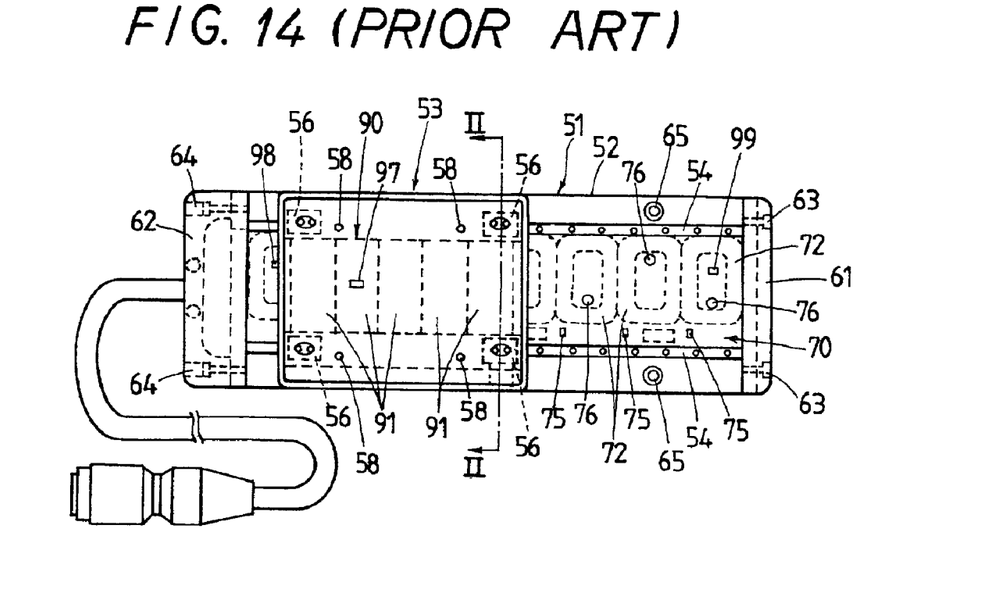
FIG. 14 is a top plan view showing a conventional sliding means.
Figure 15:
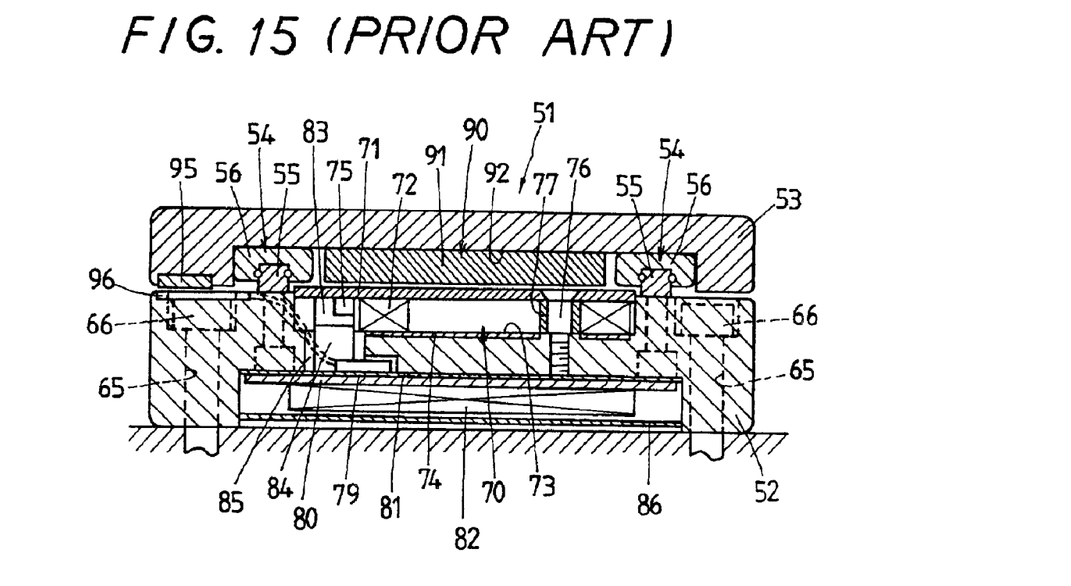
FIG. 15 is a view in section along the plane II—II of FIG. 14 showing the conventional sliding means.

The sliding means disclosed in the above Japanese Patent Laid-Open No. 266659/1997 will be explained below, with referring to FIGS. 14 and 15. A sliding means 51 with an built-in linear motor is composed of a stationary bed 52 and the moving table 53, both of which are made of magnetic material such as steel to serve the function of magnetic circuit, or magnet yoke and coil yoke, thereby rendering the linear motor small or compact in size. The sliding means 51 with built-in linear motor has the stationary elongated bed 52, and the moving table 53 mounted on the bed 52 for linearly reciprocating movement lengthwise of the bed 52 by virtue of linear motion guide units 54. The linear motion guide units 54 are comprised of two track rails 55 arranged on the bed 52 in parallel with each other, and four sliders 56 fitting over the associated track rail 55 for sliding movement. In the linear motion guide units 54, load raceway areas are provided between confronting raceway grooves, one of which is formed on lengthwise sides of the track rails 55 while the counterpart is formed on the sliders 56. The sliders 56 are allowed to move with smooth along the track rails 55 as rolling elements run through the load raceway areas. The table 53 is bored with holes 58 through which screws fit to fix a work on the table 53. An end block 61 and a connector block 62 are secured to the lengthwise opposing ends of the bed 52, each to each end, with fixing bolts 63, 64 to define a tolerable range of operating stroke of the table 53. The bed 52 is made with holes 65 through which bolts 66 fit to anchor the bed 52 to a platform.

An armature 70, which is a primary side of the sliding means 51, is comprised of a coil board 71 and eight pieces of armature windings 72 arranged on the underside of the coil board 71 in juxtaposition along the moving direction of the table 53. The bed 52 is recessed lengthwise at 73 on the upper surface thereof, where the armature 70 is accommodated through an insulating film 74. Hall-effect elements 75 are arranged on the coil board 71 in conjunction with the armature windings 72, each to each winding. The Hall-effect elements 75 are to issue a signal in response to an amount of magnetic flux created by a secondary field magnet 90, which is detected when the field magnet 90 approaches the Hall-effect elements 75. Excitation of the armature windings 72 is controlled depending on the signal issued out of the Hall-effect elements 75. The armature 70 is jointed to the bed 52 by means of machine screws 76 fitting through spacers 77, which make abutment at their opposing ends against both the bed 52 and the coil board 71 at locations offset widthwise of the bed 52 between any two adjacent armature windings 76 from one another.

The bed 52 is also made with a recess 79 at the underside opposite to the upper recess 73. A driving board 80 is received in the lower recess 79 through an insulating film 81. The driving board 80 is to apply electricity to the armature windings 72, and mounted with a driving circuit 82 composed of diverse electronic components. The driving board 80 is connected with the coil board 71 via connectors 83, 84 extending through a hole 85 bored vertically through the bed 52. In addition, the lower recess 79 in the bed 52 is closed with a cover 86.

The field magnet 90, which is the secondary side of the linear motor, is installed in a recess 92 formed in the table 53 and secured to the underside of the table 53. The field magnet 90 is composed of platy magnets 91 arranged such that unlike poles (N, S) on the platy magnets 91 alternate along the moving direction of the table. The table 53 mounted with the platy magnets 91 provides a magnet yoke forming a part of magnetic circuit, while the bed 52 provides a coil yoke for each armature winding 72, which also forms a part of magnetic circuit. When the preselected current is applied to each armature coil 72, a thrust force is created between the primary and secondary sides on the basis of Fleming's rule to drive the table 53 integral with the secondary field magnet 90 in a sliding manner by virtue of the linear motion guide units 54.

To determine the reference position of the table 53 with respect to the bed 52, a Hall-effect element 97 is installed inside the second armature winding 72 from the left. The reference position may be identified by a signal issued at a time when the Hall-effect element 97 has detected the leftmost platy magnet 91 in the field magnet 90. Besides, two Hall-effect elements 98, 99 are attached to the coil board 71 inside the leftmost and rightmost armature windings 72, each to each winding, to provide limit sensors that ensure keeping the table 53 from travelling over the tolerated range of moving stroke. Each Hall-effect element 98, 99, when the table 53 has traveled over the tolerated range of the operating stroke, may respond to any associated pole at the leftmost and rightmost extremities of the field magnet 90 to issue a signal reporting the accidental event where the table has run away from the desired stroke. In order to monitor the relative location of the table 53 to the bed 52 in the sliding means 51, the table 53 is provided at one lengthwise side thereof with a magnetic linear scale 95 in which unlike magnetic poles (N, S) are arranged alternately with a fine pitch along the moving direction of the table 53, while the bed 52 has a sensor head 96 responsive to the magnetic scale 95.

In the sliding means 51 with built-in linear motor constructed as stated earlier, there is employed a system in which electric conduction is controlled every each armature winding 72 and, therefore, both the driving board 80 and the driving circuit 82 are built in underneath the bed 52. This system makes the sliding means complicated and bulky in construction. Besides, the linear scale is made of magnetic scale.

In a sliding means with built-in moving-magnet linear motor in which a table is arranged on a bed for sliding movement, the bed having supported thereon an armature winding while the table being mounted with a field magnet on a surface confronting the bed so that the current flowing through the armature winding interacts in an electromagnetic manner with magnetic flux created by the field magnet to drive the field magnet together with the table, it has been desired to make the sliding means light in operation, simple and slim in construction, light in weight and much more precious in position control of the table to the bed. To this end, there are problems to be solved in conduction system for the armature winding, material for the field magnet, design of the high resolving-power encoder and fixing means for the sensor cords.

SUMMARY OF THE INVENTION

The present invention has as its primary object to overcome the problems as described just above and more particular to provide a sliding means with built-in moving-magnet linear motor, in which conduction system for armature windings, material of field magnets, design of a high resolving-power encoder and fitting means for sensor cords are improved to render a stationary bed much more slim or thin in construction, thus reducing the overall height of the sliding means. Thus, the present invention contemplates to develop a sliding means with built-in moving-magnet linear motor, which is made simple or compact in construction, light and smooth in operation, and improved in operating speed and response ability of the table movement, thereby making it possible to ensure the high accuracy of position control of the moving table to the bed.

The present invention relates to a sliding means with built-in moving-magnet linear motor, which is comprised of a bed of magnetic material, a table of magnetic material arranged movable lengthwise of the bed in a sliding manner with respect to the bed, a field magnet arranged on a surface of the table, which opposes to the bed, the field magnet having unlike poles alternating in polarity in a moving direction of the table, an armature winding installed on a surface of the bed, which confronts the field magnet of the table, and a means for monitoring a position of the table with respect to the bed, wherein the three armature windings are provided to carry a three-phase current, each to each phase, so that the three-phase current flowing in the armature windings interacts with magnetic flux created by the field magnet to produce an electromagnetic force to drive the table along the bed in a sliding manner with a desired position control.

In an aspect of the present invention, there is provided a sliding means in which the field magnet has five poles for the three armature windings. With the sliding means stated earlier, a armature assembly is composed of only three armature windings, which are the minimum for a linear motor unit, while the field magnet has the least five poles. This construction makes it possible to reduce the sliding means in size to the commercially available minimum.

According to the sliding means of this invention, the armature windings carry a three-phase current and, therefore, there is no need of providing on-board driving circuits underneath the bed as in the prior construction in which conduction systems are individually prepared for every armature winding. Thus, the sliding means may be reduced in overall height.

Now considering the modified sliding means in which the field magnet has, for example four poles, the moving stroke of the table, effective in keeping high propulsion, becomes reduced by one pole. Moreover, since the poles at forward and aft ends of the field magnet are unlike in polarity, the Hall-effect ICs, limit sensors and before-the-origin sensors must be set in compliance with unlike poles and correspondingly the construction becomes complicated. As opposed to the modification stated earlier, when the field magnet has six poles, the moving stroke of the table, effective in keeping high propulsion, becomes extended by one pole. Nevertheless, the table is inevitably rendered long by the length of one pole and correspondingly the bed is extended lengthwise. Thus, this modification of the field magnet makes the sliding means bulky in size.

With the sliding means constructed according to the present invention, the moving stroke of the table may be kept in the minimum range enough to ensure the high propulsion, and also the field magnet has like poles at the forward and aft ends thereof so that the Hall-effect ICs, limit sensors and before-the-origin sensors can be set with ease. This is effective in providing the sliding means desirable in both function and compactness.

For the sliding means of the present invention, the field magnet is preferably made of a permanent magnet of rare earth such as neodymium, which is effective in raising flux density, thereby providing high propulsion (=current×flux density). This makes it possible to ensure much high-speed movement, responsibility and accurate position control.

In another aspect of the present invention, there is provided a sliding means in which the position monitoring means is an optical encoder composed of an optical linear scale secured on the table and a sensor element installed in the bed in opposition to the optical linear scale. The optical encoder stated above is improved in resolution and less vulnerable to change in distance between the scale and the sensor element as compared with the prior magnetic encoder, thus ensuring the highly accurate position control of the table. With the optical encoder employed for the position monitoring means, the optical linear scale is arranged on the underside of the table while the sensor element is installed in the bed. Thus, there is no sensor cord or line moving in conjunction with the operation of the sliding means. The construction is effective in keeping the sliding means itself low in the occurrence of dust and dirt, thus realizing clean environment. Employment of the optical encoder rather than the magnetic encoder results in improvement in resolution and high accuracy.

In the sliding means of the present invention, the current flowing in the armature windings interacts with the magnetic flux created by the field magnet to produce an electromagnetic force, for the sake of which the field magnet is allowed to move together with the table serving as the magnet yoke by virtue of the linear motion guide units with respect to the bed serving as the coil yoke. The relative arrangement of the armature windings with the field magnet according to the present invention serves well to establish the efficient electromagnetic reaction despite realizing significant space saving.

In another aspect of the present invention, there is provided a sliding means wherein the armature winding is composed of a resinous core molded in a form of rectangle, and turns wound around the core. The core of molded resin serves well to preserve the shape of the armature winding.

In a further another aspect of the present invention, there is provided a sliding means in which the table is provided with an origin mark to define an origin of the table, while the bed is made with a limit sensor to detect the poles at forward and aft ends of the field magnet and a before-the-origin sensor to monitor the origin mark, both the sensors being placed at forward and aft ends of the bed along the moving direction of the table. Both the limit sensors and before-the-origin sensors are to sense any one of the forward and aft ends of the field magnet, thus making it possible to control the position and stroke of the table relatively to the bed.

In another aspect of the present invention, there is provided a sliding means in which the bed has an end block at any one of the forward and aft ends thereof in the moving direction of the table, and has a connector block at another of the forward and aft ends, the connector block having an electric power cord to be connected to the armature windings and a sensor line to be connected to the position monitoring means. Moreover, elastic stoppers are mounted on the blocks, each to each block, to buffer collision with the table. If the table were moved beyond the tolerated stroke range with respect to the bed, the elastic stopper inside the end block or the connector block would buffer the collision with the table to protect the sliding means against breakage.

In another aspect of the present invention, there is provided a sliding means in which a moving stroke of the table with respect to the bed is defined in such a range that forward and aft ends of the table remain at most between centers of forward and aft coil sides of the armature windings. That is to say, the table is allowed to move over the armature windings without deviating from the forward and aft outermost coil sides of the armature windings. In this way the current conducting through the armature windings may interact at the most efficiency with the magnetic flux produced by the field magnet. This makes it possible to continue keeping the high propulsion of the table.

In a further another aspect of the present invention, there is provided a sliding means in which the field magnet is mounted on forward and aft ends thereof with end plates, each to each end, of magnetic material to keep the magnetic flux created by the field magnet against magnetic leakage. As the end plates keep the magnetic flux established in the field magnet from leakage out of the forward and aft ends of the table, anything approaching the table may be protected against magnetic affection.

In another aspect of the present invention, a sliding means, in which the table fits on the bed in a lengthwise sliding manner by virtue of a linear motion guide unit, which is composed of track rails provided on the bed and a slider mounted on the bed for sliding movement and having thereon the table.

In another aspect of the present invention, there is provided a sliding means in which the field magnet is at most equal in height to the linear motion guide unit while the armature winding is accommodated in a recess formed in the bed between the track rails. Moreover, the armature windings are installed in juxtaposition along the sliding direction of the table in the recess formed in the bed. Thus, the bed may be made as slim as possible so that the sliding means is made much reduced in overall height. The track rails for the linear motion guide units are arranged on widthwise opposing sides of the recess in parallel with each other whereby the table is allowed to move steady along the bed. The encoder may be arranged on the bed and table sidewise outside any one of the linear motion guide units.

In a further another aspect of the present invention, there is provided a sliding means in which the armature windings are attached to a coil board that is secured to the bed to close the recess, and the armature windings are each formed in a flat shape and fixed in juxtaposition in the moving direction of the table to a surface of the coil board, which is exposed to the recess. The armature assembly of the armature windings with the coil board is made as thin or slim as possible in thickness to be snugly accommodated in the recess.

The sliding means constructed as stated earlier, as being made as compact as possible in size, realizes space saving in production, storage, conveying, installation and use thereof. Moreover, the sliding means of the present invention makes for an improvement in working environment, and further providing position control mechanism that is suitable for clean room and high in propulsion, operating speed and responsibility.

DETAILED DESCRIPTION OF THE PREFERRED EMBODIMENTS

Preferred embodiments of a sliding means with built-in moving-magnet linear motor according to the present invention will be explained hereinafter in detail with reference to the accompanying drawings.

Figure 1:
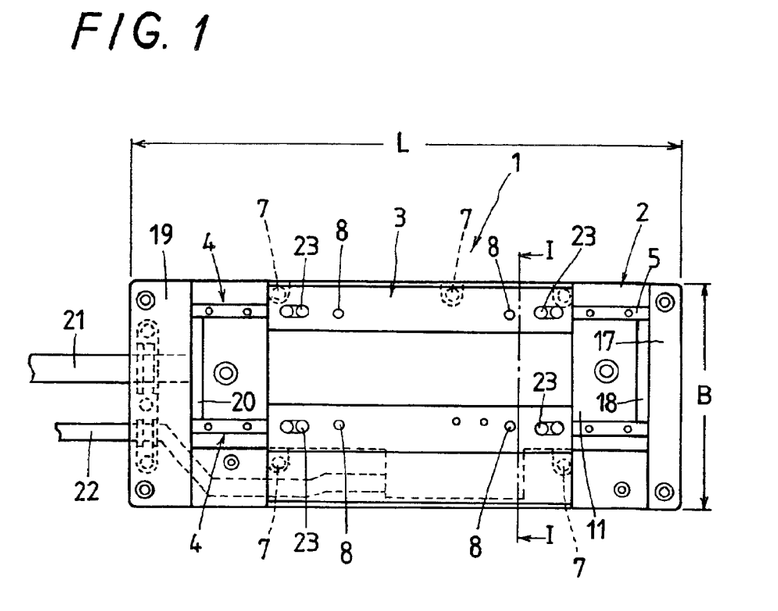
FIG. 1 is a top plan view showing a preferred embodiment of a sliding means with built-in moving-magnet linear motor in accordance with the present invention.
Figure 2:
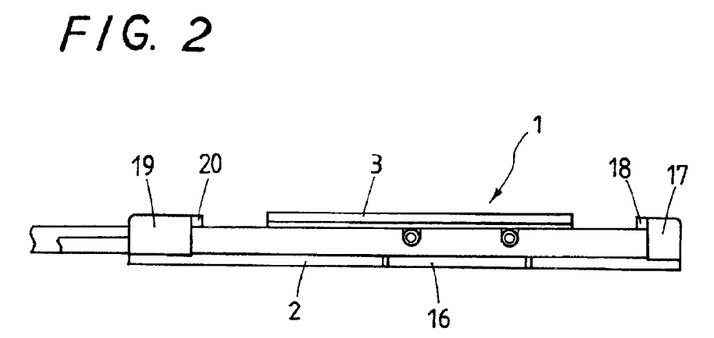
FIG. 2 is a front elevation of the sliding means shown in FIG. 1.

Referring to FIGS. 1 to 9, a sliding means 1 is mainly comprised of an elongated steel bed 2 of rectangular shape in top plan view, secured to any stationary machine or instrument, and a steel table 3 of rectangular shape mounted on the bed 2 for linearly sliding movement lengthwise of the bed 2 by virtue of linear motion guide units 4. The linear motion guide units 4 are composed of a pair of track rails 5 secured to the bed 2 with fixing screws so as to extend lengthwise of the bed 2 in parallel with one another, and sliders 6 fitting over and conforming to the track rails 5, two sliders to each rail, for sliding movement relatively of the track rails 5. The table 3, since affixed to the sliders 6 of the linear motion guide units 6, is allowed to move as the sliders 6 run along the track rails 5. The table 3 is fastened on the sliders 6 with screws 23 drilled into the sliders 6 to the extent where the tops of their screwheads are buried below the top surface of the table 3. With the present sliding means 1 shown in FIGS. 1 and 4, the bed 2 is made with holes 7 through which bolts stretch to clamp the bed 2 together with any stationary base, while the table is bored with threaded holes 8 into which screws are driven to secure any work thereon. The sliding means is, as shown in FIG. 2, made in a flat construction reduced in overall height.

Each slider 6 has, for example, a casing, a pair of end caps attached on froward and aft ends of the casing respectively, and end seals mounted on the outer surfaces of the end caps, each to each cap, and clamped together with the end caps to the casing. Besides, the end caps are provided with grease nipples. The casing is made with raceway grooves confronting raceway grooves on widthwise-opposing, lengthwise-extending sides of the track rails 5. The confronting raceway grooves define between them parts of recirculating passages through which rolling elements contained therein are allowed to run in a row. The recirculating passages consist of load raceway grooves formed in the casing to define load raceways in conjunction with the raceway grooves on the track rails 5, return passages formed in the casing and turnarounds formed in the end caps to connect the load raceways with the return passages. Thus, the sliders 6 are allowed to move with smooth on and along the track rails 5 as the rolling elements in the recirculating passages run through the load raceways defined between the casing and the track rails.

Figure 3:
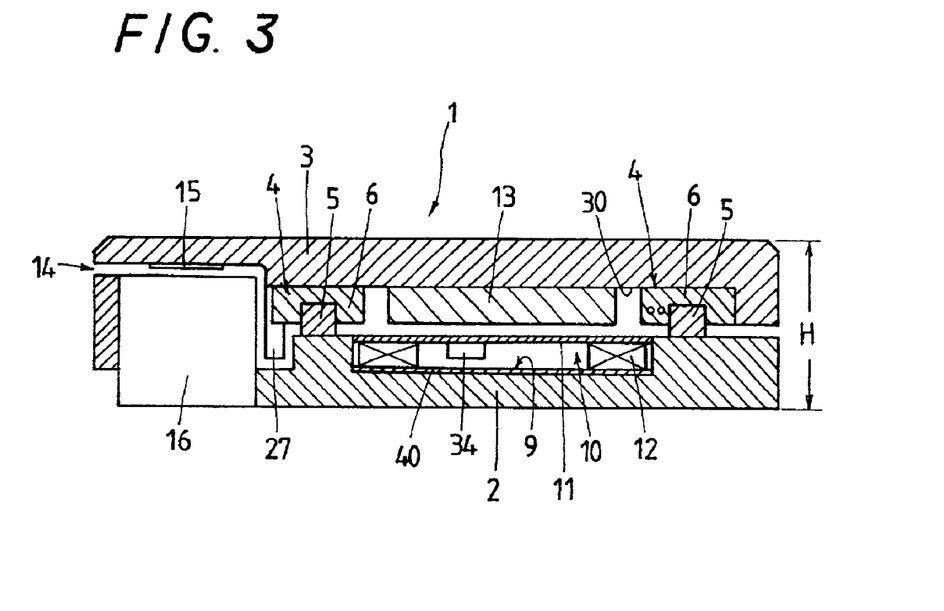
FIG. 3 is a cross-sectional view of the sliding means, taken along the plane I—I of FIG. 1.
Figure 4:
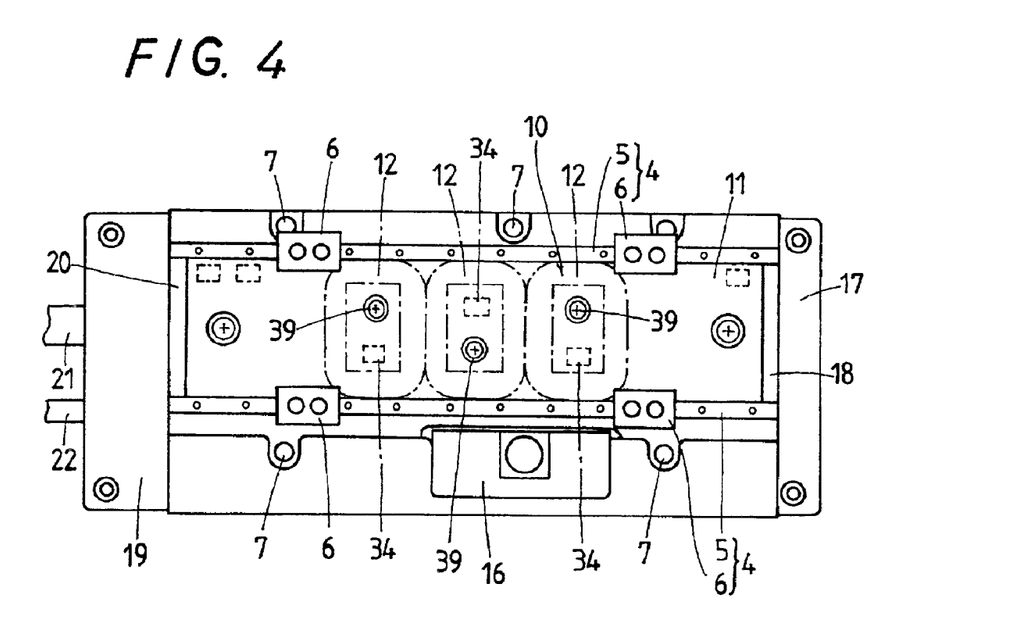
FIG. 4 is a top plan view of the sliding means shown in FIG. 1, with a moving table being removed.

As seen from FIGS. 3 and 4, the bed 2 is made on the upper surface thereof with a recess 9 extending between the widthwise-opposing linear motion guide units 4 along the moving direction of the table 3. Snugly fitted in the recess 9 is an armature assembly 10 of stator side, which is comprised of a coil board 11 and armature windings 12 affixed to the coil board 11. A moving element of a field magnet 13 made of a rectangular 5-pole permanent magnet is mounted underneath the table 3 in opposition of the armature assembly 10. The sliding means 1 operates on linear motor action in which a three-phase current flowing through the armature windings 12 will interact electromagnetically with a magnetic flux created by the field magnet 13, driving the table 3 in a sliding manner towards a desired position. Control means and driver means for the control means and a power source are installed outside the sliding means 1. An optical encoder 14 for monitoring a position of the table 3 with respect to the bed 2 is composed of an optical linear scale 15 arranged along the moving direction of the table 3 underneath the table 3, and a sensor element 16 fitted in the bed 2 about midway of the bed 2 in opposition to the optical linear scale 15.

Fixed to any one of the lengthwise opposing ends of the bed 2 by tightening fixing means such as bolts with internal hexagonal-socket head is an end block 17 serving as a limiter to keep the table 3 from shooting outside the end of the bed 2 owing to the movement beyond the tolerated range of operating stroke. The end block 17 is mounted on a side thereof facing the table 3 with a stopper 18 of elastic body such as urethane rubber. A connector block 19 is attached to another end of the bed 2 by means of the same fixing means as in the end block 17. Besides serving as a limiter to keep the table 3 from shooting outside the end of the bed 2 owing to the movement beyond the tolerated range of operating stroke, the connector block 18 may serve to guide an electric power line for supplying electric power to the armature windings 12 to energize the linear motor, a signal line 21 for the detection element, and a sensor cord 22 for delivering a signal monitoring a position of the table 3 relatively to the bed 2, without possible disconnection. The sensor cord 22 is connected to a controller unit, which is to supply electric power for energizing the linear motor through the signal line 21, depending on position information issued via the sensor cord 22. The connector block 19 is also mounted on a side thereof facing the table 3 with a stopper 20 of elastic body of urethane rubber. These stoppers 18, 20 provide buffers for protecting the slider 6 from a collision that might occur when the slider 6 comes close to the limit of its stroke.

Attached on an underside 30 of the table 3 is a field magnet 13 composed of five rectangular poles 24, which are arranged in such a manner that unlike poles alternate with each other along the moving direction of the table 3. According to the embodiment shown here, the field magnet 13 is a permanent magnet made of rare earth such as neodymium, and so on, in which N-poles are placed at forward and aft ends thereof. The table 3 is made of magnetic material of steel to serve as a magnet yoke allowing the magnetic flux created by the field magnet 13 to permeate through there. Thus, there is no need of preparing separately the magnet yoke to be attached to the table 3, and therefore the moving element of the linear motor may be made compact or slim in construction.

The field magnet 13 is provided on the forward and aft ends thereof with steel-made end plates 25 for the prevention of flux leakage. The end plates 25 keep the magnetic flux established in the field magnet 13 from leakage out of the forward and aft ends of the table 3, protecting anything approaching the table 3 against magnetic affection. Each end plate 25 is equal in width to about half of a coil-side width d, shown in FIG. 7, of the armature winding 12, for example 2.5 mm width, and also equal in thickness to the field magnet 13. As an alternative, the end plates 25 are integrally with the table 3. The fore-and aft optical linear scale is attached to the underside 30 of the table 3 at the lengthwise side thereof opposing to the sensor element 16 in the bed 2, while an origin mark 28 is mounted in opposition to the side surface of the sensor element 16 to an L-bracket 27, shown in FIG. 3, neighboring the linear scale 15 in an attitude normal to the underside 30 of the table 3. A magnet is embedded in the center of the origin mark 28 to issue a signal reporting the origin or reference position to the sensor element 16.

Figure 7:
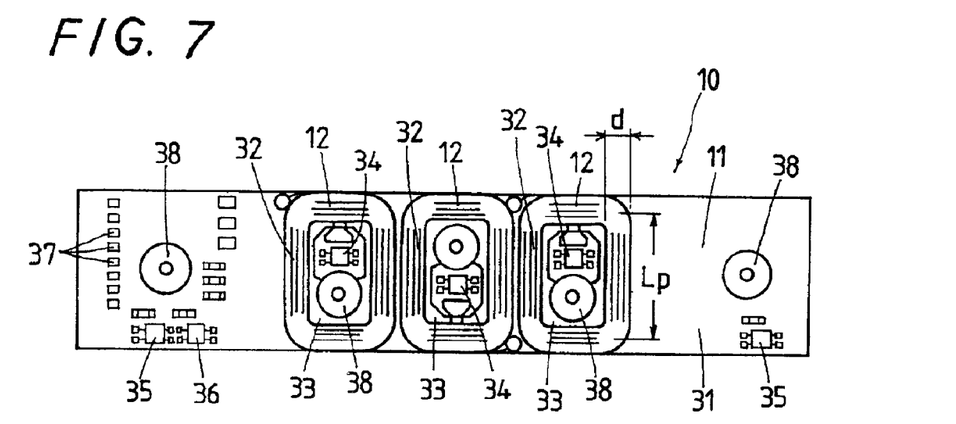
FIG. 7 is a rear elevation showing an armature assembly in the sliding means of FIG. 1.
Figure 8:
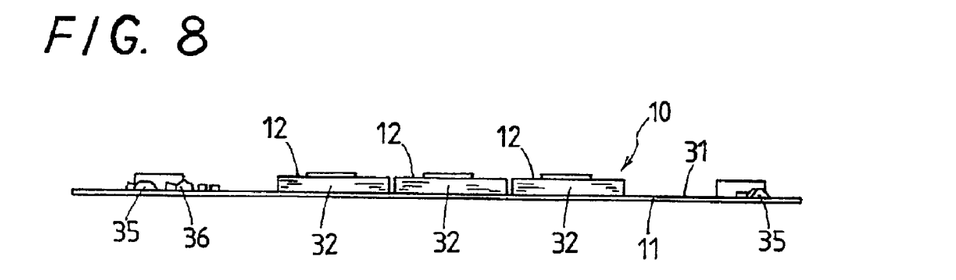
FIG. 8 is a front elevation of the armature assembly shown in FIG. 7.
Figure 9:
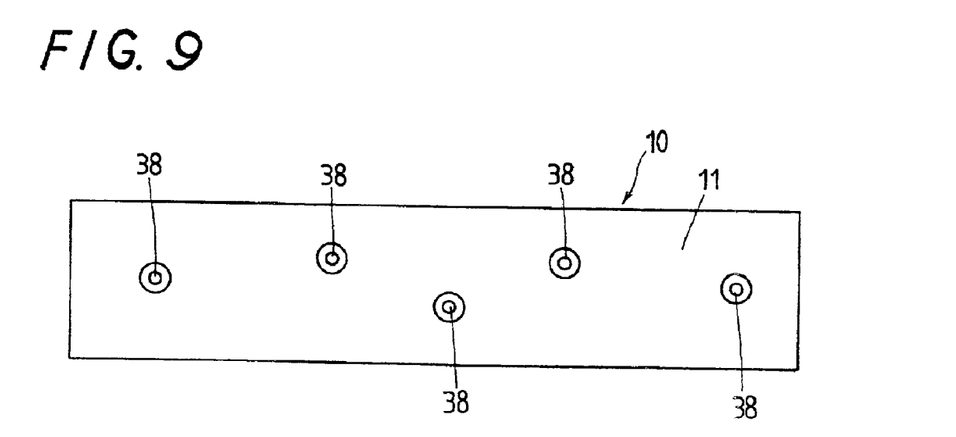
FIG. 9 is a rear plan view showing a coil board used in the armature assembly of FIG. 7.

The armature assembly, as shown in detail in FIGS. 7 to 9, is comprised of a coil board 11 of level thin sheet, and three flat armature windings 12 for three-phase current arranged in juxtaposition along the moving direction of the table 3 on the underside 31 of the coil board 11 and secured thereto with adhesive. The armature assembly 10 is accommodated in the recess 9 in the bed 2 in such a relation that the armature windings 12 are arranged in opposition to the field magnet 13. Each armature winding 12 is made in the form of three-phase coreless coil, which includes a core 33 of molded resin and turns 32 looped around the core 33 in the form of rectangle. Hall-effect elements or Hall ICs 34 to detect the magnetic poles, for example N-poles on the field magnet 13 are fixed to the coil board 11 in opposition to the field magnet 13 midway between the forward and aft coil sides of each armature winding 12. The Hall-effect ICs 34 are to detect any specific pole, for example N-pole to identify the position of the field magnet 13, depending on what Hall-effect ICs have detected the specific pole at the beginning when the electric source has been turn on, thereby to control the electric current to the armature windings 12 in light of the detected position of the field magnet 13.

Limit sensors 35 to respond to the poles or N-poles 24 of the field magnet 13 are attached to the underside of the coil board 11 at any one lengthwise side thereof. The limit sensors 35 serve as detection elements where the N-poles at the forward and aft ends of the field magnet 13 are monitored to keep the table 3 against overrunning the tolerated range. In addition, a sensor 36, which will be called "before-the-origin sensor", is arranged nearby just before any one of the limit sensors 35 along the moving direction of the table 3. The before-the-origin sensor 36 serves as a detection element to monitor any N-pole of the forward and aft ends of the field magnet 13 for decelerating the table 3 to make the origin mark 28 on the table 3 align with the origin embedded in the side of the sensor element 16. On the underside 31 of the coil board 11, there are formed terminals 37 for wiring a power source line for the armature windings 12, and signal lines for the Hall-effect ICs 34, limit sensors 35 and before-the-origin sensor 36. Moreover, the coil board 11 is made with holes 38 in which bolts fit to mount the coil board 11 to the bed 2. The coil board 11 constructed as shown in FIGS. 3 and 4 is accommodated in the lengthwise-extended recess 9 in the bed 2, and affixed to the bed 2 by screwing flush bolts through the holes 39 into the bed 2.

The bed 2 is made of magnetic material of steel such as, for example ferromagnetic material: S45C so as to serve as the coil yoke for the armature assembly 10. Since there is no need of providing separately coil yokes, the stator side of the linear motor may be reduced in size. This makes it possible to render the linear motor much compact or slim in construction. Besides, an insulating film 40 is inserted between the bed 2 and the armature coils 12 placed in the recess 9.

The following explains how the sliding means 1 operates. That is to say, when the armature winding 12 carries current, a rotation of magnetic flux generated around the coil sides of the armature winding interacts with the magnetic flux that exists always in perpendicular direction across the air gap between the field magnet 13 and the bed 2 serving as the coil yoke. Thus, the armature windings 12 experience a horizontal force according to the Fleming's rule. With the reaction, the moving element of the field magnet 13 is forced to drive the table 3. The current supplied to the armature winding 12 is turned over correspondingly to the direction of the magnetic flux, which is desired in compliance with the moving direction of the field magnet 13. Eventually the table 3 is allowed to move in a sliding manner to the desired position. The acceleration control depending on the amount of current is combined with detection of the current position by the optical encoder 14 to realize accurate position control of the table 3 in the sliding direction. Moreover, the driving speed and position control of the table 3 is accomplished by combining the sliding means 1 with control system including personal computers, sequencers and drivers.

Figure 10:
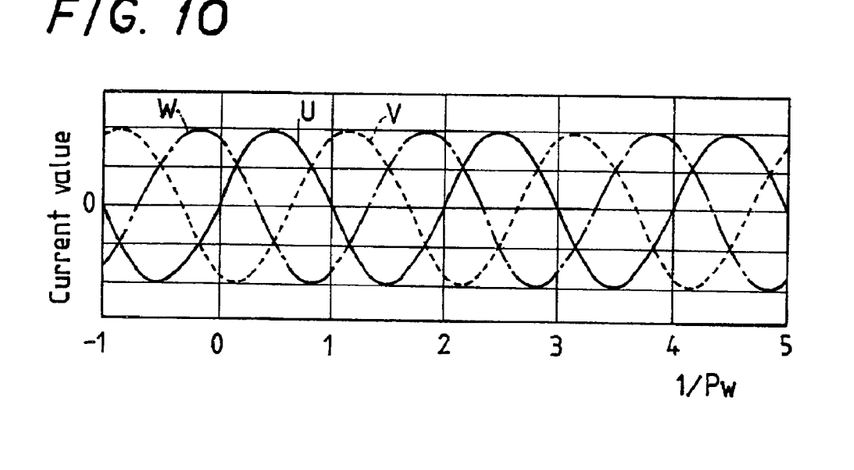
FIG. 10 is a diagram illustrating waveforms of currents changing with time, which are supplied to the armature windings.
Figure 11:
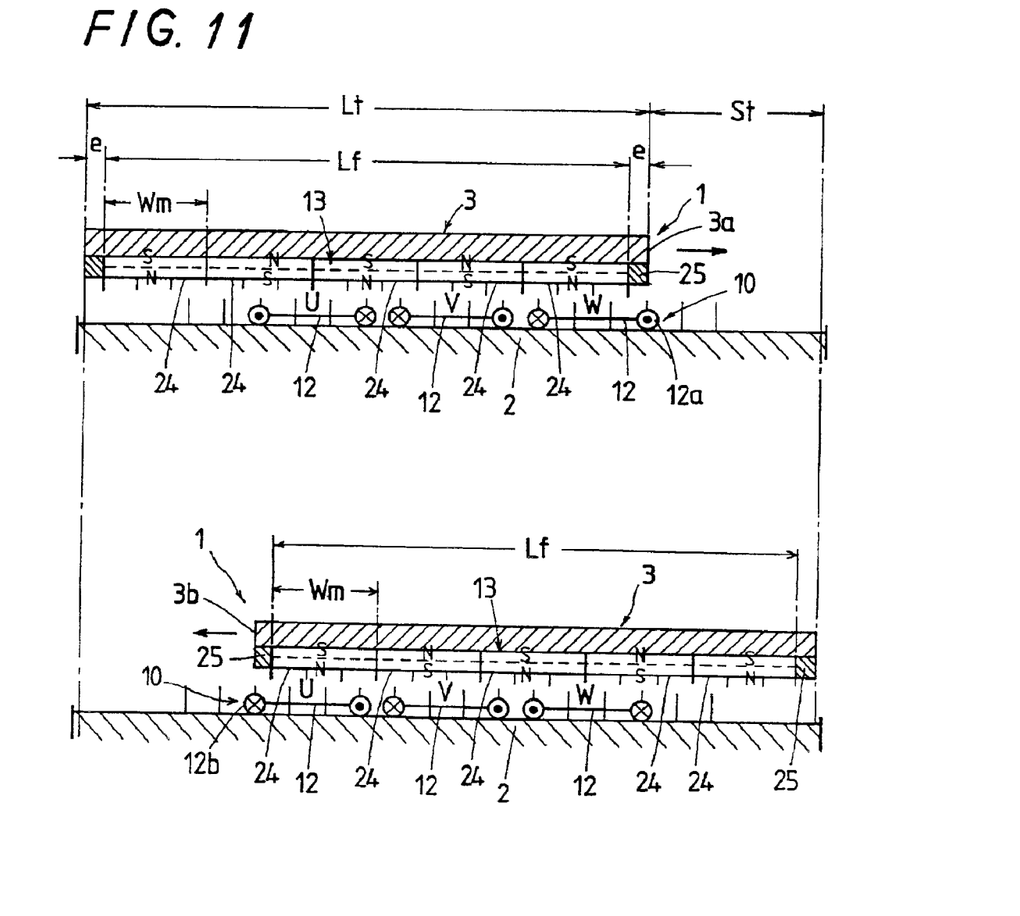
FIG. 11 is a schematic illustration explaining the operation of the sliding means shown in FIGS. 1 to 9, in which an upper part shows the event where the table is going to move rightwards at the leftmost end of stroke range, while a lower part is another event the table is going to move leftwards at the rightmost end of stroke range.
Figure 12:
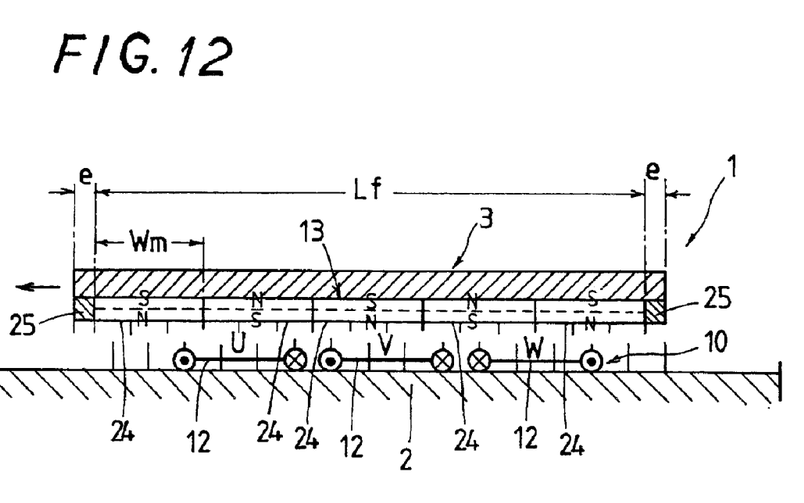
FIG. 12 is a schematic illustration explaining the operation of the sliding means shown in FIGS. 1 to 9, where a three-phase current flowing through the armature windings serves to drive the table leftwards at an arbitrary position.
Figure 13:
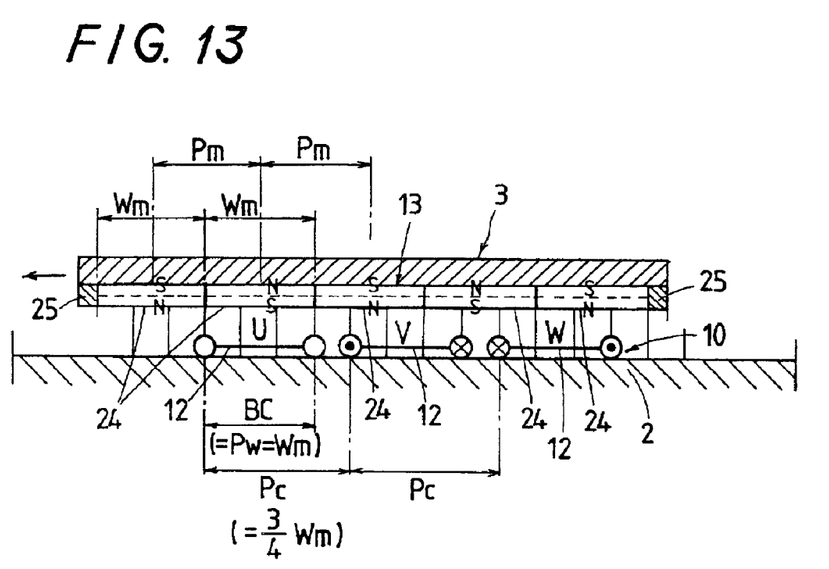
FIG. 13 is an illustration showing the same operation found in FIG. 12, in which the table is driven leftwards.

Referring to FIG. 10 there is illustrated changing with time of current supplied to the armature assembly 10 of the sliding means 1. The current to the armature assembly 10, as seen from FIG. 10, is a three-phase current of U-, V- and W-phases that are 120° in the electrical angle out of phase. The numbers on the abscissa indicate the magnification of a half-wavelength for each phase. Next, FIGS. 11 to 13 show operating events of the sliding means 1. In FIG. 11, the upper part shows the event where the table 3 is going to move rightwards at the leftmost end of stroke range, while the lower part is another event the table 3 is going to move leftwards at the rightmost end of stroke range. In either event, the table 3 is controlled such that the rightmost end 3a thereof is invariably kept just above the center of the rightward coil side 12a of the rightmost armature winding 12 while the leftmost end 3b thereof is kept just above the center of the leftward coil side 12b of the leftmost armature winding 12. That is to say, the table 3 is allowed to move over the juxtaposed armature windings 12 without deviating from the forward and aft outermost coil sides 12a, 12b. In this way the current conducting through the armature windings 12 may interact at the most efficiency with the magnetic flux produced by the field magnet 13. This makes it possible to continue keeping the high propulsion of the table 3.

FIGS. 12 and 13, respectively, explains how the table 3 at an arbitrary position moves leftward when the armature windings 12 carry three-phase current. With the event shown in FIG. 13, the leftmost armature winding 12 is placed just below a boundary between the adjacent unlike poles in the field magnet 13 and the current becomes zero. In the event in FIG. 12, all the six coil sides of the armature windings 12 carry current. In FIG. 13, although only four coil sides carry current, the propulsion may be kept high independent of the number of the alive coil side of the armature windings 12 because the flux density becomes great at the center of each pole 24 and the amount of current also varies in compliance with the position of the poles 24. Even when it is tough to keep the propulsion high, the moving stroke of the table 3 may be set over the stroke shown in FIGS. 12 and 13, such that the coil side of any armature winding 12 is permitted deviating outside the poles 24.

Figure 5:
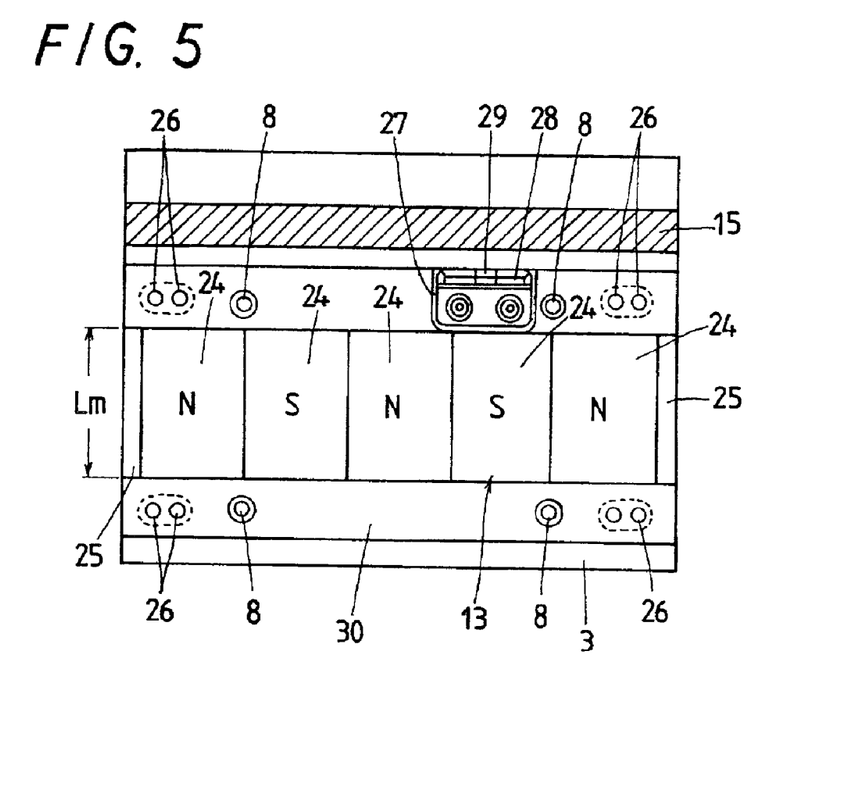
FIG. 5 is rear elevation of the moving table used in the sliding means of FIG. 1.
Figure 6:
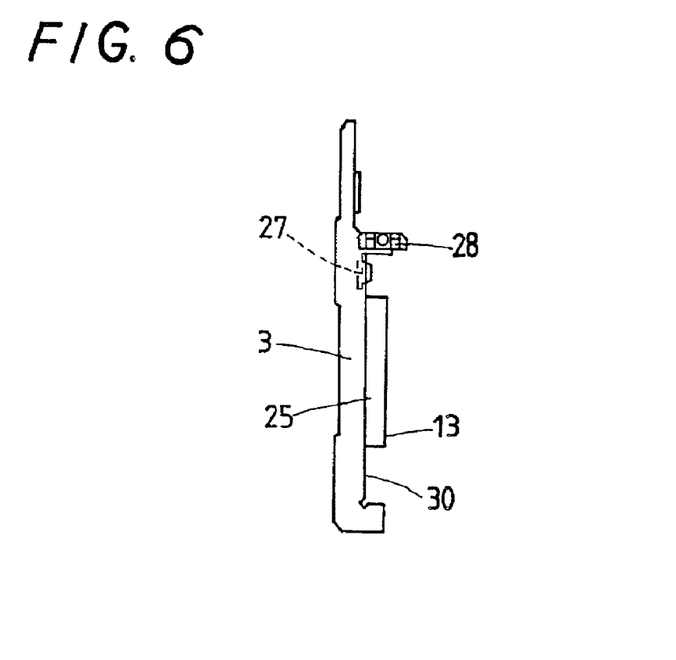
FIG. 6 is a side elevation, viewed from the left side, of the table shown in FIG. 5.

Now assuming a pole width in the field magnet 13 is Wm, as will be seen from FIG. 12, a pole pitch Pm is equal with Wm: Pm=Wm, an interval Bc between the centers of the opposing coil sides of any armature winding 12 is equal to the pole width Wm: Bc=Wm, and a coil pitch Pc of the armature winding 12 is 4/3 Wm: Pc=4/3 Wm. A widthwise length Lm of the field magnet 13, shown in FIG. 5, is made substantially equal with a distance Lp, shown in FIG. 7, between the centers of widthwise opposing coil ends of any armature winding 12. In accordance with the embodiment stated earlier, for example the pole width Wm is 15 mm, and a stroke St of the table 3, refer to FIG. 11, is 25 mm. A length Lf of the field magnet 13 is 75 mm, the total length Lt of the table 3 including the forward and aft end plates 25 of 2.5 mm in thickness per a plate becomes 80 mm. Moreover, the sliding means 1 constructed as stated here is, for example 14 mm in height H indicated in FIG. 3, 145 mm in fore-and-aft length L in FIG. 1 and 60 mm in width B in FIG. 1.

What is claimed is:

1. A sliding means with built-in moving-magnet linear motor, comprising a bed of magnetic material, a table of magnetic material arranged movable lengthwise of the bed in a sliding manner with respect to the bed, a field magnet arranged on a surface of the table, which opposes to the bed, the field magnet having unlike poles alternating in polarity in a moving direction of the table, armature windings installed on a surface of the bed, which confronts the field magnet of the table, and a means for monitoring a position of the table with respect to the bed, wherein said armature windings consist of three armature windings composed of coreless coils each having a substantially rectangular flat shape, said coils being arranged in juxtaposition in the lengthwise direction of movement of the table, each of said armature windings being connected to receive a respective phase of a three-phase current, so that the three-phase current flowing in the armature windings interacts with magnetic flux created by the field magnet to produce an electromagnetic force to drive the table along the bed in a sliding manner with a desired position control, wherein the field magnet is made of a permanent magnet of rare earth and has five poles for the three armature windings, and wherein the table fits on the bed in the lengthwise direction of movement of the table by virtue of a linear motion guide unit, which is composed of track rails provided on the bed and a slider mounted on the bed for sliding movement, the slider having the table thereon.

2. A sliding means constructed as recited in claim 1, wherein the position monitoring means is an optical encoder composed of an optical linear scale secured on the table and a sensor element installed in the bed in opposition to the optical linear scale.

3. A sliding means constructed as recited in claim 1, wherein the field magnet is at most equal in height to the linear motion guide unit while the armature windings are accommodated in a recess formed in the bed between the track rails.

4. A sliding means constructed as recited in claim 1, wherein a moving stroke of the table with respect to the bed is defined in such a range that forward and aft ends of the table remain at most between centers of forward and aft coil sides of the armature windings.

5. A sliding means constructed as recited in claim 1, wherein the field magnet is mounted on forward and aft ends thereof with end plates, each to each end, of magnetic material to keep the magnetic flux created by the field magnet against magnetic leakage.

6. A sliding means constructed as recited in claim 1, wherein the armature windings are installed in juxtaposition along the sliding direction of the table in the recess formed in the bed.

7. A sliding means constructed as recited in claim 1, wherein the armature windings are attached to a coil board that is secured to the bed to close a recess formed in the bed, and the armature windings are fixed in juxtaposition to a surface of the coil board, which is exposed to the recess.

8. A sliding means constructed as recited in claim 1, wherein each of the armature windings is composed of a resinous core molded in a form of rectangle, and turns wound around the core.

9. A sliding means constructed as recited in claim 1, wherein the table is provided with an origin mark to define an origin of the table, while the bed is made with a limit sensor to detect the poles at forward and aft ends of the field magnet and a before-the-origin sensor to monitor the origin mark, both the sensors being placed at forward and aft ends of the bed along the moving direction of the table.

10. A sliding means with built-in moving-magnet linear motor, comprising a bed of magnetic material, a table of magnetic material arranged movable lengthwise of the bed in a sliding manner with respect to the bed, a field magnet arranged on a surface of the table, which opposes to the bed, the field magnet having unlike poles alternating in polarity in a moving direction of the table, three armature windings installed on a surface of the bed, which confronts the field magnet of the table, and a means for monitoring a position of the table with respect to the bed, wherein each of the three armature windings is provided to carry a respective phase of a three-phase current, so that the three-phase current flowing in the armature windings interacts with magnetic flux created by the field magnet to produce an electromagnetic force to drive the table along the bed in a sliding manner with a desired position control, wherein the bed has an end block at any one of the forward and aft ends thereof in the moving direction of the table, and has a connector block at another of the forward and aft ends, the connector block having an electric power cord to be connected to the armature windings and a sensor line to be connected to the position monitoring means, and elastic stoppers are mounted on the blocks, each to each block, to buffer collision with the table.

* * * * *